United States Patent
Chen et al.

(10) Patent No.: US 11,826,999 B2
(45) Date of Patent: Nov. 28, 2023

(54) MULTI-PURPOSE COMPOSITE MEMBRANE WITH HIGH BREAKAGE STRENGTH AND HIGH PEEL STRENGTH AND PREPARATION METHOD AND USE THEREOF

(71) Applicant: Guangdong Angsi Advanced Materials Technologies Co., Ltd., Shantou (CN)

(72) Inventors: Xubin Chen, Shantou (CN); Daojun Zhang, Shantou (CN); Yangxin Chen, Shantou (CN); Wenbin Cai, Shantou (CN); Yang Zhao, Shantou (CN); Jiale Huang, Shantou (CN)

(73) Assignee: GUANGDONG ANGSI ADVANCED MATERIALS TECHNOLOGIES CO., LTD., Shantou (CN)

( * ) Notice: Subject to any disclaimer, the term of this patent is extended or adjusted under 35 U.S.C. 154(b) by 0 days.

(21) Appl. No.: 17/834,088

(22) Filed: Jun. 7, 2022

(65) Prior Publication Data
US 2023/0264463 A1    Aug. 24, 2023

(30) Foreign Application Priority Data
Feb. 24, 2022   (CN) .......................... 202210171097.7

(51) Int. Cl.
*B32B 37/24*       (2006.01)
*B32B 5/02*        (2006.01)
(Continued)

(52) U.S. Cl.
CPC .............. *B32B 37/24* (2013.01); *B32B 5/02* (2013.01); *B32B 7/12* (2013.01); *B32B 27/12* (2013.01);
(Continued)

(58) Field of Classification Search
CPC .......... B32B 2037/243; B32B 2255/02; B32B 2255/10; B32B 2255/26; B32B 2307/402;
(Continued)

(56) References Cited

U.S. PATENT DOCUMENTS 3,893,252 A * 7/1975 Chase ...................... A47G 1/17
                                                  40/773
4,246,058 A * 1/1981 Reed .................... B26D 7/1827
                                                 156/719

(Continued)

OTHER PUBLICATIONS

English translation of CN114474769.*

*Primary Examiner* — Sonya M Sengupta
(74) *Attorney, Agent, or Firm* — McClure, Qualey & Rodack, LLP

(57) ABSTRACT

The present invention provides a multi-purpose composite membrane with high breakage strength and peel strength and preparation method and use thereof, and relates to the technical field of shoemaking material preparation. The preparation method of the multi-purpose composite membrane with high breakage strength and peel strength comprises the following steps: (1) processing layer preparation; (2) functional layer preparation; (3) functional composite layer preparation; (4) resin layer preparation; and (5) composite membrane preparation. In the present invention, the composite membrane containing the substrate layer, the pattern design base layer, the resin layer and the texture fabric made by the foregoing five steps has good high and low temperature flexural resistance, low temperature fracture resistance, high strip forces and high delay wash times.

10 Claims, 6 Drawing Sheets

(51) Int. Cl.
  *B32B 7/12* (2006.01)
  *B32B 27/12* (2006.01)
  *B32B 27/30* (2006.01)
  *B32B 27/36* (2006.01)
  *B32B 37/06* (2006.01)
  *B32B 37/12* (2006.01)
  *B32B 38/00* (2006.01)
  *B32B 43/00* (2006.01)

(52) U.S. Cl.
  CPC ............ *B32B 27/306* (2013.01); *B32B 27/36* (2013.01); *B32B 37/06* (2013.01); *B32B 37/12* (2013.01); *B32B 38/0004* (2013.01); *B32B 43/006* (2013.01); *B32B 2037/243* (2013.01); *B32B 2255/02* (2013.01); *B32B 2255/10* (2013.01); *B32B 2255/26* (2013.01); *B32B 2307/402* (2013.01); *B32B 2307/5825* (2013.01); *B32B 2307/748* (2013.01); *B32B 2331/04* (2013.01); *B32B 2367/00* (2013.01); *B32B 2437/02* (2013.01)

(58) Field of Classification Search
  CPC ...... B32B 2307/5825; B32B 2307/748; B32B 2331/04; B32B 2367/00; B32B 2437/02; B32B 27/12; B32B 27/306; B32B 27/36; B32B 37/06; B32B 37/12; B32B 37/24; B32B 38/0004; B32B 43/006; B32B 5/02; B32B 7/12
  USPC .......................................... 156/235, 249, 250
  See application file for complete search history.

(56) References Cited

U.S. PATENT DOCUMENTS

| | | | | |
|---|---|---|---|---|
| 4,312,686 A | * | 1/1982 | Smith | B32B 37/26 156/277 |
| 4,544,590 A | * | 10/1985 | Egan | G09F 3/0288 428/912.2 |
| 4,604,312 A | * | 8/1986 | Creighton | D06N 7/0007 156/252 |
| 5,879,489 A | * | 3/1999 | Burns | B29C 64/40 156/64 |

* cited by examiner

MULTI-PURPOSE COMPOSITE MEMBRANE WITH HIGH BREAKAGE STRENGTH AND HIGH PEEL STRENGTH AND PREPARATION METHOD AND USE THEREOF

TECHNICAL FIELD

The present invention relates to the technical field of shoe material preparation, especially a multi-purpose composite membrane with high breakage and high peel strength and preparation method and use thereof.

BACKGROUND TECHNOLOGY

Thermoplastic elastomer (TPE/TPR) is a kind of material that can soften or change repeatedly at a certain thermal condition, and maintain its physical appearance at normal temperature, however is neither poisonous nor hazardous to the earth and the environment as being completely degradable. Membranes are double-layer films made from granules by casting and extrusion, have integrated excellent physical properties of TPU, are of moisture permeability and water resistance, and widely used in manufacturing industries such as shoemaking, clothes, sports and pharmaceutics, and to improve functionality thereof, membranes are usually made to be composite membranes. Existing composite membranes used in shoemaking industries are usually provided with coloration effects, however, breakage strength and wear resistance properties thereof are poor, in order to improve ornamental performance of the composite membranes, it is usually necessary to combine a plurality of layers together, however, slippage and stripping among each membrane layer may occur when subjected to long term foreign forces, and peel strength of the composite membranes and usage life thereof will be influenced.

SUMMARY OF THE INVENTION

To overcome the problems existing in the prior art, a main purpose of the present invention is to provide a multi-purpose composite membrane with high breakage strength and peeling strength and preparation method and use thereof. To realize the foregoing purpose, in one aspect, the present proposes a preparation method of a multi-purpose composite membrane with high breakage strength and peel strength, comprising the following steps:
  (1) Processing layer preparation: coating an adhesive layer over a surface of a first base layer, and obtaining the processing layer;
  (2) Functional layer preparation: coating a second base layer over a surface of the adhesive layer by lamination technologies, cutting the second base layer to be a waste base layer and a pattern design base layer by cutting technologies, stripping off the waste base layer and obtaining the functional layer;
  (3) Functional composite layer preparation: coating a substrate layer over a surface of the pattern design base layer of the functional layer by heat press lamination technologies, stripping the first base layer and the adhesive layer from the surface of the pattern design base layer and obtaining the functional composite layer;
  (4) Resin layer preparation: coating resin over a surface of a side of a texture fabric with textures and obtaining the resin layer;
  (5) Base cloth free composite layer preparation: laminating the resin in the resin layer with the pattern design base layer in the functional composite layer by heat press lamination technologies and obtaining the base cloth free composite membrane; and
  (6) Composite membrane preparation: binding the pattern design base layer in the functional composite layer and the resin in the resin layer by heat press lamination technologies and obtaining the composite membrane.

In the technical solution of the present invention, by the foregoing six steps, a composite membrane comprising a base layer, a substrate layer, a pattern design base layer, a resin layer and a texture fabric can be obtained, the composite membrane has good high and low temperature flexural resistance, low temperature fracture resistance, high peel strength and high delay wash times. It shall be noted that a sequence of the step (3) and the step (4) doesn't make difference.

As a preferred embodiment of the preparation method according to the present invention, after the step (5), the preparation method further comprises: laminating by heat press lamination technologies the substrate layer of the composite membrane with a base cloth and obtaining a base cloth containing composite membrane.

As a preferred embodiment of the preparation method according to the present invention, in the step (2), after coating a second base layer over the surface of the adhesive layer by laminating technologies, the preparation method further comprising: coating a colored resin layer over a surface of the second base layer, cutting the second base layer coated with the colored resin layer to be the waste base layer and the pattern design base layer, stripping off the waste base layer and obtaining a colored functional layer.

As a preferred embodiment of the preparation method according to the present invention, after coating the colored resin layer over the surface of the second base layer, the preparation method further comprising: coating a third base layer on a surface of the colored resin layer, stripping off the third base layer, cutting the second base layer coated with the colored resin layer to be the waste base layer and the pattern design base layer by cutting technologies, stripping off the waste base layer and obtaining the colored functional layer.

As a preferred embodiment of the preparation method according to the present invention, in the step (1), after coating evenly the adhesive layer over the surface of the first base layer, the preparation method further comprising: coating a fourth base layer on a surface of the adhesive layer, stripping the fourth base layer and obtaining the processing layer.

As a preferred embodiment of the preparation method according to the present invention, the step (3) coating the substrate layer over the surface of the pattern design base layer of the functional layer by heat press laminating technologies comprises any of the following (a) to (c):
  (a) Directly laminating the substrate layer over the surface of the pattern design base layer of the functional layer by heat press lamination technologies;
  (b) Coating resin over the surface of the substrate layer, laminating a side of the substrate layer coated with resin with the surface of the pattern design base layer of the functional layer by heat press lamination technologies; or
  (c) Coating resin over the surface of the pattern design base layer of the functional layer and coating the substrate layer directing over the surface of the pattern design bas layer coated with resin by heat press lamination technologies.

As a preferred embodiment of the preparation method according to the present invention, in the step (1) the first base layer comprises at least one of PET, PP, PC, PVC, PE, OPP, TPU, PU, TPE, EVA, TPEE, PA, PPS, PI, ABS, PMMA, latex, rubber, organic silicon rubber, metallic membranes, paper, artificial leather, artificial leather base cloth, animal furs, bark, fibrous membranes, unwoven cloth and woven cloth.

As a preferred embodiment of the preparation method according to the present invention, in the step (1), the adhesive layer comprises one of a general super strong bonding agent, a general strong bonding agent, a strong bonding agent for chilled food, a general re-release adhesive, and a fiber re-release adhesive.

As a preferred embodiment of the preparation method of the present invention, in the step (2), the second base layer comprises at least one of blue violet gradient films, laser films, electroplating films, reflective membranes, glass microballoons, microprisms, lenticules, perm-selective membranes, antireflection coatings, colored films, gradient rainbow films, luminous films, metallic films, animal furs, barks, fiber membranes, artificial leather, unwoven cloth and woven cloth.

As a preferred embodiment of the present invention, in the step (2), the second base layer is at least one of PET, PP, PC, PVC, PE, OPP, TPU, PU, TPE, TPEE, PA, PPS, PI, ABS, PMMA, EVA, latex, rubber, organic silicon rubber, metallic membranes, paper, artificial leather, artificial leather bas cloth, animal furs, bark, fibrous membranes, unwoven cloth and woven cloth.

As a preferred embodiment of the present invention, in the step (1), the fourth base layer is at least one of PET, PP, PC, PVC, PE, OPP, TPU, PU, TPE, TPEE, PA, PPS, PI, ABS, PMMA, EVA, latex, rubber, organic silicon rubber, metallic membranes, paper, artificial leather, artificial leather base cloth, animal furs, bark, fibrous membranes, unwoven cloth and woven cloth.

As a preferred embodiment of the preparation method according to the present invention, in the step (2), the cutting technologies comprise at least one of cross cutting, plane cutting, rolling cutting, laser engraving, die cutting, high frequency cutting, common cutting and common engraving.

As a preferred embodiment of the preparation method according to the present invention, in the step (3), the substrate layer is at least one of PET, PP, PC, PVC, PE, OPP, TPU, PU, TPE, TPEE, PA, PPS, PI, ABS, PMMA, EVA, latex, rubber, organic silicon rubber, metallic membranes, paper, artificial leather, artificial leather bas cloth, animal furs, bark, fibrous membranes, unwoven cloth and woven cloth.

As a preferred embodiment of the preparation method according to the present invention, in the step (4), the resin layer comprises at least one of high temperature resin and low temperature resin.

As a preferred embodiment of the preparation method according to the present invention, the step (4) specifically comprises: coating high temperature resin over a surface at a side of the texture fabric and coating the low temperature resin over a surface of the high temperature resin.

PU high temperature resin is characterized by being scraping resistant and flexural resistant, and PU low temperature resin is characterized by good binding properties.

In the technical solutions of the present invention, by first coating the PU high temperature resin at the surface of the side of the texture fabric, and coating PU low temperature resin over the surface of the PU high temperature resin, the PU low temperature resin is finally bound to the pattern design base layer in the functional composite layer, so that the composite membrane can not only satisfy the peel strength test and is also provided with good high and low temperature flexural resistance and low temperature fracture resistance.

As a preferred embodiment of the preparation method according to the present invention, the base cloth is at least one of artificial leather, artificial leather base cloth, animal furs, bark, rubber, organic silicon rubber, latex, paper, fibrous membranes, metallic membranes, fiber cloth, fiberglass cloth, looped fabric, woven fabric, weaved cloth and non-woven cloth.

In a second aspect, the present invention further provides a multi-purpose composite membrane with high breakage strength and peel strength obtained by the foregoing preparation method.

In a third aspect, the present invention further provides use of the multi-purpose composite membrane with high breakage strength and peel strength in making shoemaking materials, clothes, cases and bags, seats, sofas, wall clothes, wall paper, carpets, curtains and car covers. During use, strip the texture fabric off from the composite membrane, so that the PU resin layer will be exhibited, the substrate layer and the base cloth can be combined with other materials or directly contact skins as necessary.

Compared with the prior art, beneficial effects of the present invention are that:

In the technical solutions according to the present invention, by preparing in sequence the processing layer, the functional layer and the functional composite layer (the resin layer) and binding the functional composite layer and the resin layer, the composite membrane is obtained, and the composite membrane comprising the substrate layer, the pattern design base layer, the PU resin layer and the texture fabric has good high and low temperature flexural resistance, and has high peel strength and high delay washing times.

Figure 1:
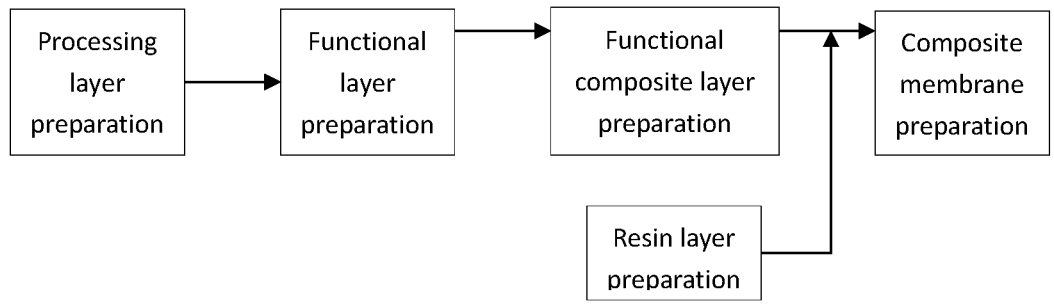
FIG. 1 is a flowchart diagram showing preparation of the composite membrane according to an embodiment 1 of the present invention.

In the drawings: 1—pattern design base layer; and 2—waste base layer.

EMBODIMENTS

To better illustrate purposes, technical solutions and advantages of the present invention, hereafter the present invention will be further described with some embodiments.

Embodiment 1

Figure 2:
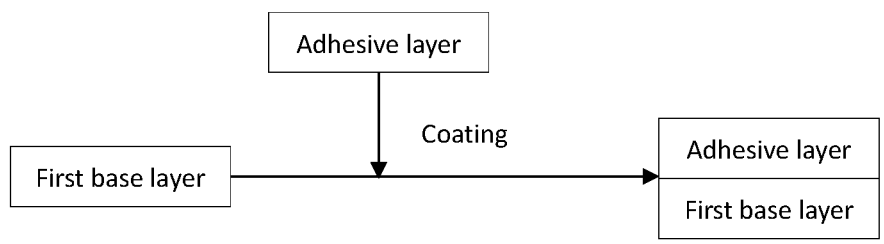
FIG. 2 is a flowchart diagram showing preparation of the processing layer in the step (1) of the embodiment 1 of the present invention.
Figure 3:
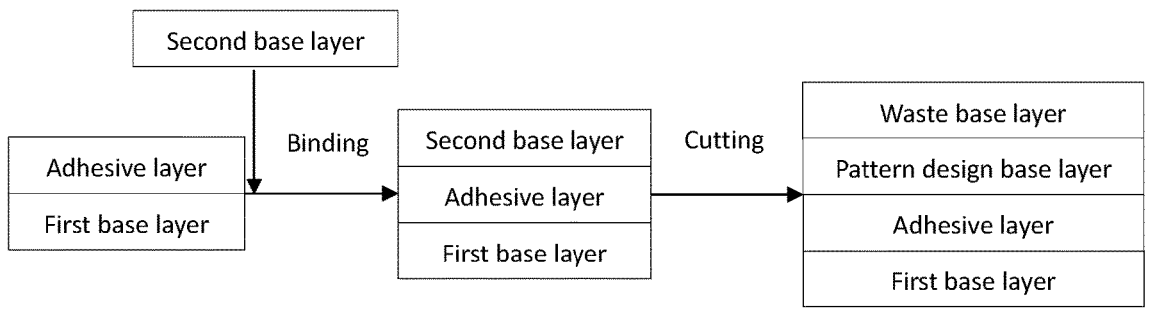
FIG. 3 is a flowchart diagram showing preparation of the functional layer in the step (2) of the embodiment 1 of the present invention.
Figure 4:
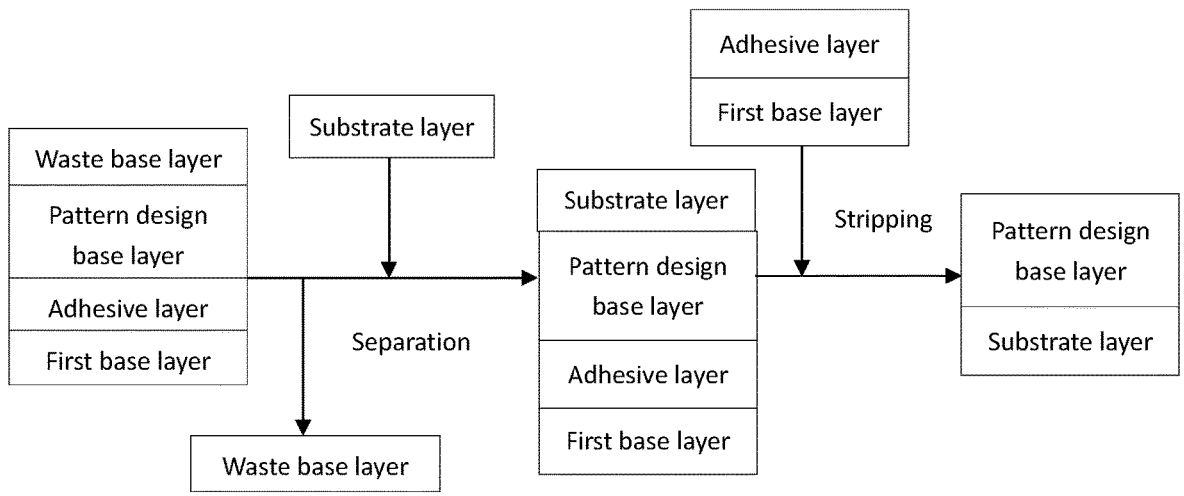
FIG. 4 is a flowchart diagram showing preparation of the functional composite layer in the step (3) of the embodiment 1 of the present invention.
Figure 5:
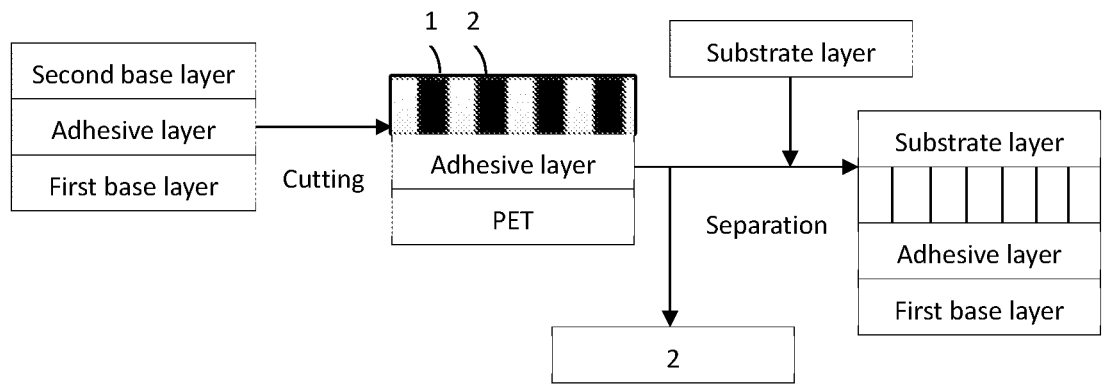
FIG. 5 is a diagram showing cross cutting processes in the step (2), separation and binding processes in the step (3) of the embodiment 1 of the present invention.
Figure 6:
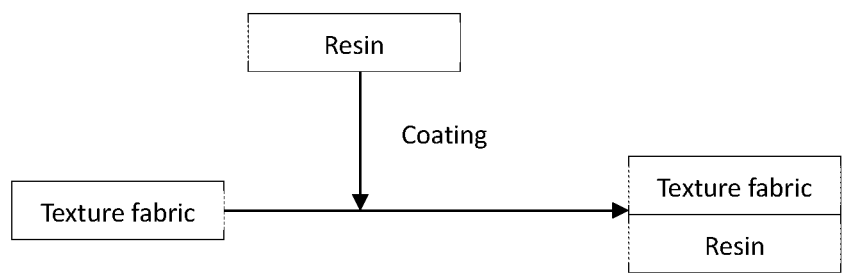
FIG. 6 is a flowchart diagram showing the resin layer in the step (4) of the embodiment 1 of the present invention.
Figure 7:
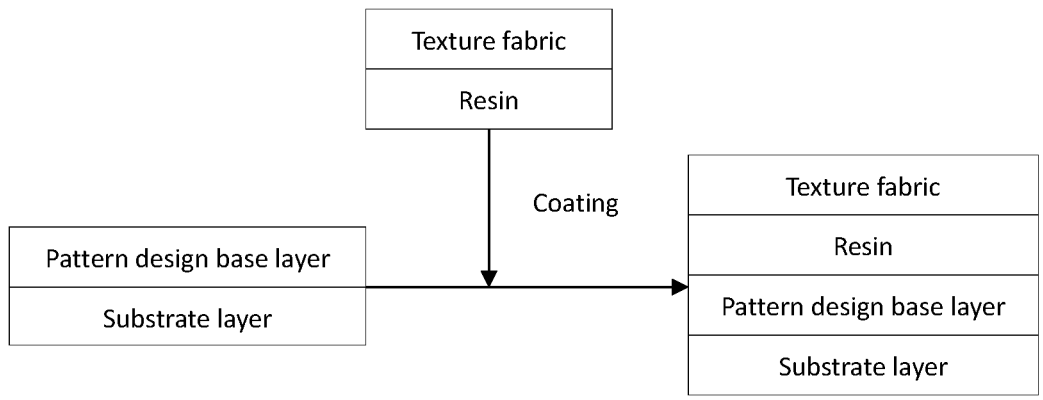
FIG. 7 is a flowchart diagram showing preparation of the composite membrane in the step (5) of the embodiment 1 of the present invention.

In the present embodiment, the preparation method of the multi-purpose composite membrane comprises the following steps:
(1) Processing layer preparation (as shown in FIG. 2): coating evenly an adhesive layer over a surface of a first base layer, binding a second base layer to a surface of the adhesive layer and obtaining the processing layer, wherein, the first base layer is PET, the adhesive layer is methyl acrylate, and the second base layer comprises PP paper;
(2) Functional layer preparation (as shown in FIG. 3 and FIG. 5): stripping the second base layer of the processing layer off, binding the second base layer on the surface of the adhesive layer by binding technologies, cutting the second base layer to be a waste base layer and a pattern design base layer by cutting technologies, stripping the waste base layer off and obtaining the functional layer, wherein, the second base layer is a rainbow film, the cross cutting technology is plane cutting, and it shall be noted that, in the present step, the waste base layer and the pattern design base layer remain on the same plane after cross cutting;
(3) Functional composite layer preparation (as shown in FIG. 4 and FIG. 5): binding a substrate layer directly to a surface of the pattern design base layer of the functional layer by heat press lamination technologies, stripping the first bas layer and the adhesive layer from the pattern design base layer and obtaining the functional composite layer, wherein the substrate layer is EVA;
(4) Resin layer preparation (as shown in FIG. 6): coating resin over a surface of a side of a texture fabric with textures and obtaining the resin layer, wherein the resin is PU low temperature resin; and
(5) Composite membrane preparation (as shown in FIG. 7): laminating the pattern design base layer in the functional composite layer and the resin in the resin layer by heat press lamination technologies and obtaining the composite membrane.

Embodiment 2

Figure 8:
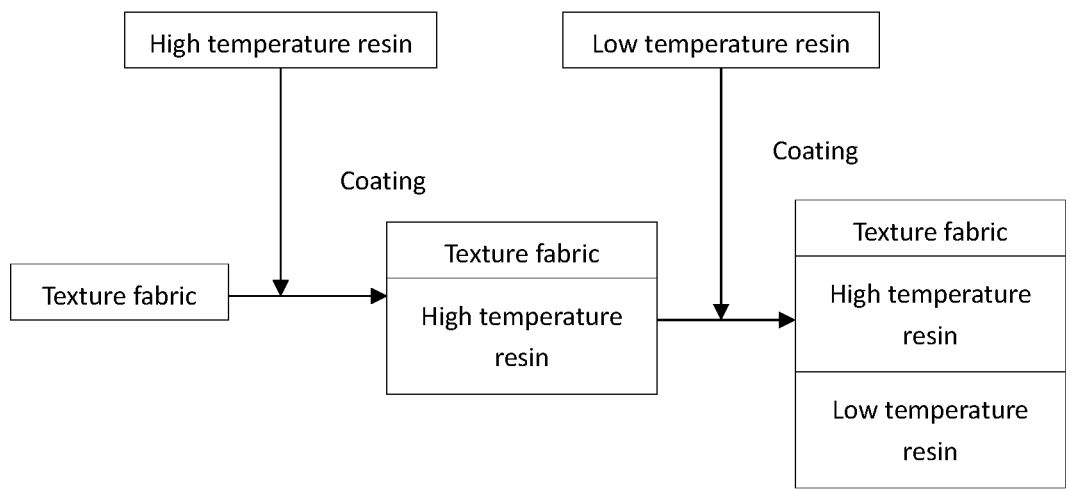
FIG. 8 is a flowchart diagram showing preparation of the resin layer in the step (4) of an embodiment 2 of the present invention.

The preparation method of the multi-purpose composite membrane in the present embodiment is basically the same as the embodiment 1, and the only difference is that: as shown in FIG. 8, in the step (4) of the present embodiment, first high temperature resin is coated over the surface of the side of the texture fabric and low temperature resin is coated on a surface of the high temperature resin.

Embodiment 3

Figure 9:
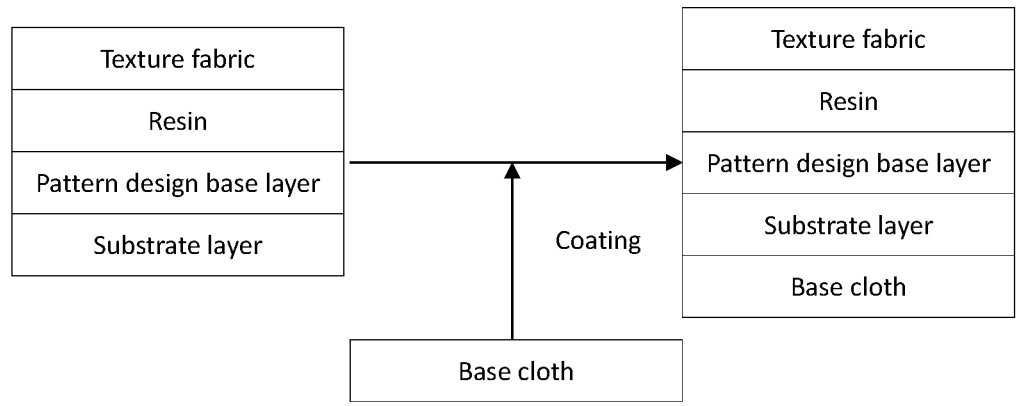
FIG. 9 is a flowchart diagram showing preparation of the composite membrane containing the base cloth according to an embodiment 3 of the present invention.

The preparation method of the multi-purpose composite membrane in the present embodiment is basically the same as the embodiment 2, and the only difference is that: as shown in FIG. 9, after the step (5), the preparation method further comprises: laminating the substrate layer of the composite membrane and a base cloth and obtaining a composite membrane containing the base cloth.

Embodiment 4

Figure 10:
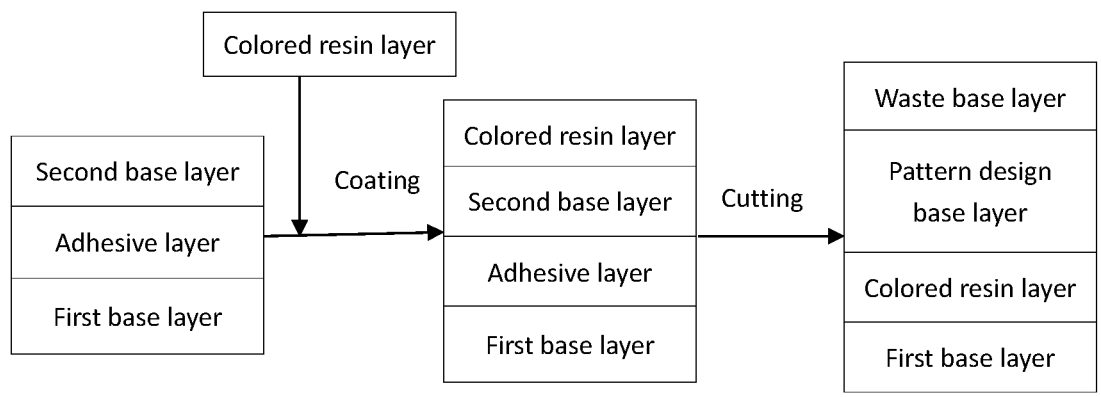
FIG. 10 is a flowchart diagram showing preparation of the functional layer in the step (2) of an embodiment 4 of the present invention.

The preparation method of the multi-purpose composite membrane in the present embodiment is basically the same as the embodiment 2, and the only difference is that: as shown in FIG. 10, in the step (2), after coating the second base layer on the surface of the adhesive layer by heat press lamination technologies, the preparation method further comprises: coating a colored resin layer on a surface of the second base layer, cutting the second base layer containing the colored resin layer to be a waste base layer and a pattern design base layer by cutting technologies, stripping off the waste base layer and obtaining a colored functional layer.

Embodiment 5

Figure 11:
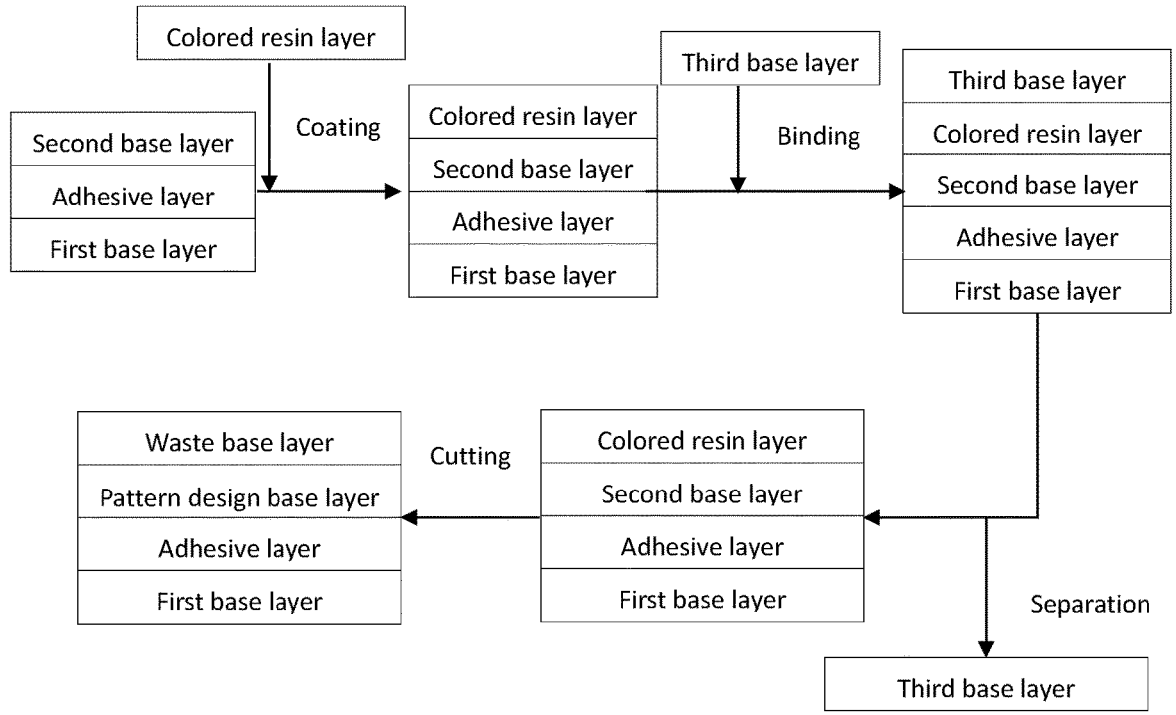
FIG. 11 is a flowchart diagram showing preparation of the functional layer in the step (2) of an embodiment 5 of the present invention.

The preparation method of the multi-purpose composite membrane according to the present embodiment is basically the same as the embodiment 4, the only difference is that: as shown in FIG. 11, in the step (2), after coating the colored resin layer over the surface of the second base layer, the preparation method further comprises: coating a fourth base layer over a surface of the colored resin layer, stripping the fourth base layer off, cutting the second base layer containing the colored resin layer to be a waste base layer and a pattern design base layer by cutting technologies, stripping the waste base layer off and obtaining a colored functional layer.

Embodiment 6

The preparation method of the multi-purpose composite membrane according to the present embodiment is basically the same as the embodiment 1, the only difference is that: in the step (3) functional composite layer preparation comprises specifically: coating resin over a surface of the substrate layer, and laminating a side of the substrate layer coated with resin and the pattern design base layer in the functional layer by heat press lamination technologies.

Embodiment 7

The preparation method of the multi-purpose composite membrane in the present embodiment is basically the same as the embodiment 1, the only difference is that: in the step (3) the functional composite layer preparation comprises specifically: coating resin over a surface of the pattern design base layer of the functional layer and laminating the surface of the pattern design base layer coated with resin directly on the substrate layer by heat press lamination technologies.

Embodiment 8

Figure 12:
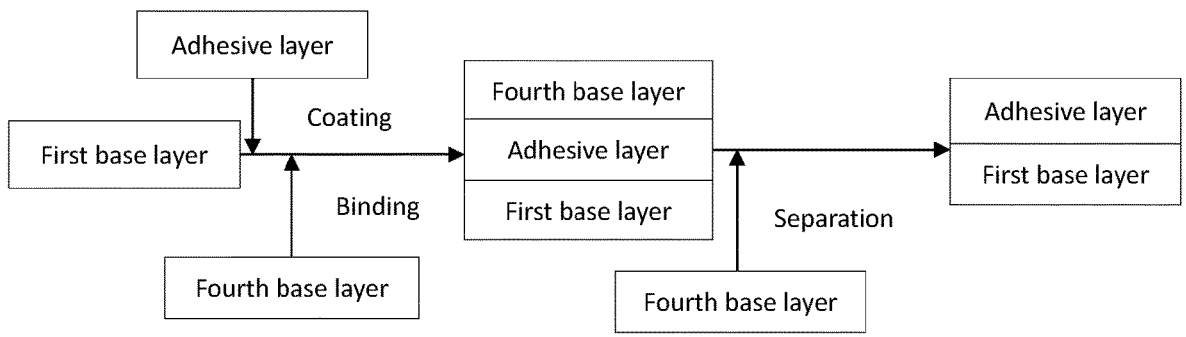
FIG. 12 is a flowchart diagram showing preparation of the processing layer in the step (1) of an embodiment 8 of the present invention.

The preparation method of the multi-purpose composite membrane according to the present embodiment is basically the same as the embodiment 1, the only difference is that: as shown in FIG. 12, in the step (1) processing layer preparation comprises specifically: coating resin over a surface of the pattern design base layer of the functional layer, and laminating the substrate layer directly over the surface of the pattern design base layer coated with resin by heat press laminating technologies.

Comparative Example 1

The membrane material in the present comparative example is a common commercial product, bought from Shenzhen Meishengda Packaging Material Co., Ltd., and the model no. is ASCG-PET;

The membrane material in the present comparative example contains only a layer, and the layer is made from any one of color films, laser films, electroplated films, reflective membranes, rainbow gradient films, luminous films and plant fiber environmental friendly films.

Comparative Example 2

The membrane material in the present comparative example is a common commercial product, bought from Meiyike New Material Technology Co., Ltd., with a model name of YK-CHM.2;

The membrane material in the present comparative example contains two layers, the first layer is any one of color films, laser films, electroplated films, reflective membranes, rainbow gradient films, luminous films and plant fiber environmental friendly films; and the second one is any one of TPE, EVA, TPE, PU, silica gel, PP, PVC, PE and PET, and the first layer and the second layer are laminated together by heat press lamination technologies.

Performance test is done as per the following table 1 to the products obtained in the embodiments of the present invention and the comparative examples

TABLE 1

| | performance test method | | |
|---|---|---|---|
| Test item | Test instrument | Test standard | Acceptance standard |
| Normal temperature flex | Normal temperature flexural tester (bending angle 22.5 ± 0.5°) | TBJC-1 leather flexural strength testing method | 60,000 times |
| Low temperature flex (−15° C. ± 1° C.) | Normal temperature flexural tester (bending angle 22.5 ± 0.5°) | | 40,000 times |
| Low temperature fracture (−15° C. ± 1° C.) | Low temperature flexural tester (flexometer fixture 40 ± 1° V-shaped) | TBJC-9 low temperature flexural testing method of vamps | 60,000 times |
| Coating strip force | Tensile testing machine | GB/T 4689-1996 | 24 N/cm |
| Screen printing strip force | Tensile testing machine | Leather-Determination | 24 N/cm |
| Laminated screen cloth strip force | Tensile testing machine | of adhesion of finish | 24 N/cm |
| Delay wash | Automatic shrinkage washer | GB/T 8629-2017 textile | No delamination after washing for 25 times |

Performance test results of the products obtained in the embodiments of the present invention and the comparative examples are shown in the following table 2.

TABLE 2

| | | performance test results of the products in the embodiments 1-8 and the comparative examples 1-2 | | | | | | | | | |
|---|---|---|---|---|---|---|---|---|---|---|---|
| Test item | Unit | Emb. 1 | Emb. 2 | Emb. 3 | Emb. 4 | Emb. 5 | Emb. 6 | Emb. 7 | Emb. 8 | Comp. eg. 1 | Comp. eg. 2 |
| Normal Temp. flex | Ten thousand times | 6 | 8 | 8 | 8 | 8 | 6 | 6 | 6 | 4 | 3 |
| Low temp. flex | Ten thousand times | 5 | 6 | 6 | 6 | 6 | 6 | 6 | 5 | 4 | 3 |
| Low temp. frac. | Ten thousand times | 6 | 8 | 8 | 8 | 8 | 7 | 7 | 6 | 5 | 4 |
| coating strip force | N/cm | 41.1 | 41.6 | 42.5 | 42.2 | 42.3 | 42.1 | 42.2 | 41.3 | 23.5 | 12.5 |
| Screen printing strip force | N/cm | 37.5 | 38.9 | 39 | 39 | 39.1 | 37.3 | 38.3 | 37.6 | 12.8 | 19.6 |

TABLE 2-continued performance test results of the products in the embodiments 1-8 and the comparative examples 1-2

| Test item | Unit | Emb. 1 | Emb. 2 | Emb. 3 | Emb. 4 | Emb. 5 | Emb. 6 | Emb. 7 | Emb. 8 | Comp. eg. 1 | Comp. eg. 2 |
|---|---|---|---|---|---|---|---|---|---|---|---|
| Screen cloth strip force | N/cm | 31.3 | 32.5 | 32.6 | 32.6 | 32.4 | 32.3 | 31.6 | 32.1 | 20.3 | 18.5 |
| Delay wash | time | 28 | 29 | 30 | 30 | 30 | 28 | 28 | 28 | 12 | 18 |
| results | — | pass | pass | pass | pass | pass | pass | pass | pass | fail | fail |

Finally, it should be noted that the above embodiments are only used to illustrate the technical solutions of the present invention and not to limit the protection scope of the present invention. Although the present invention is described in detail with reference to the preferred embodiments, those of ordinary skill in the art should understand that, the technical solutions of the present invention may be modified or equivalently replaced without departing from the spirit and scope of the technical solutions of the present invention.

The invention claimed is:

1. A preparation method of a multi-purpose composite membrane with high breakage strength and peel strength, comprising the following steps:
    (1) Processing layer preparation: coating an adhesive layer over a surface of a first base layer, and obtaining the processing layer;
    (2) Functional layer preparation: coating a second base layer over a surface of the adhesive layer by lamination technologies, cutting the second base layer to be a waste base layer and a pattern design base layer by cutting technologies, stripping off the waste base layer and obtaining the functional layer;
    (3) Functional composite layer preparation: coating a substrate layer over a surface of the pattern design base layer of the functional layer by heat press lamination technologies, stripping the first base layer and the adhesive layer from the surface of the pattern design base layer and obtaining the functional composite layer;
    (4) Resin layer preparation: coating resin over a surface of a side of a texture fabric with textures and obtaining the resin layer; and
    (5) Composite membrane preparation: binding the pattern design base layer in the functional composite layer and the resin in the resin layer by heat press lamination technologies and obtaining the composite membrane.

2. The preparation method of a multi-purpose composite membrane with high breakage strength and peel strength according to claim 1, wherein after the step (5), the preparation method further comprises: laminating by heat press lamination technologies the substrate layer of the composite membrane with a base cloth and obtaining a base cloth containing composite membrane.

3. The preparation method of a multi-purpose composite membrane with high breakage strength and peel strength according to claim 1, wherein, in the step (2), after coating a second base layer over the surface of the adhesive layer by laminating technologies, the preparation method further comprising: coating a colored resin layer over a surface of the second base layer, cutting the second base layer coated with the colored resin layer to be the waste base layer and the pattern design base layer, stripping off the waste base layer and obtaining a colored functional layer.

4. The preparation method of a multi-purpose composite membrane with high breakage strength and peel strength according to claim 3, wherein after coating the colored resin layer over the surface of the second base layer, the preparation method further comprising: coating a third base layer on a surface of the colored resin layer, stripping off the third base layer, cutting the second base layer coated with the colored resin layer to be the waste base layer and the pattern design base layer by cutting technologies, stripping off the waste base layer and obtaining the colored functional layer.

5. The preparation method of a multi-purpose composite membrane with high breakage strength and peel strength according to claim 1, wherein in the step (1), after coating evenly the adhesive layer over the surface of the first base layer, the preparation method further comprising: coating a fourth base layer on a surface of the adhesive layer, stripping the fourth base layer and obtaining the processing layer.

6. The preparation method of a multi-purpose composite membrane with high breakage strength and peel strength according to claim 1, wherein the step (3) coating the substrate layer over the surface of the pattern design base layer of the functional layer by heat press laminating technologies comprises any of the following (a) to (c):
    (a) Directly laminating the substrate layer over the surface of the pattern design base layer of the functional layer by heat press lamination technologies;
    (b) Coating resin over the surface of the substrate layer, laminating a side of the substrate layer coated with resin with the surface of the pattern design base layer of the functional layer by heat press lamination technologies; or
    (c) Coating resin over the surface of the pattern design base layer of the functional layer and coating the substrate layer directing over the surface of the pattern design bas layer coated with resin by heat press lamination technologies.

7. The preparation method of a multi-purpose composite membrane with high breakage strength and peel strength according to claim 1, wherein in the step (1), the adhesive layer comprises one of a general super strong bonding agent, a general strong bonding agent, a strong bonding agent for chilled food, a general re-release adhesive, and a fiber re-release adhesive.

8. The preparation method of a multi-purpose composite membrane with high breakage strength and peel strength according to claim 1, wherein in the step (4), the resin layer comprises at least one of high temperature resin and low temperature resin.

9. The preparation method of a multi-purpose composite membrane with high breakage strength and peel strength according to claim 8, wherein the step (4) specifically comprises: coating high temperature resin over a surface at a side of the texture fabric and coating the low temperature resin over a surface of the high temperature resin.

10. A multi-purpose composite membrane with high breakage strength and peel strength obtained by the preparation method as defined in claim 1.

* * * * *